United States Patent
Culik et al.

[15] 3,679,798
[45] July 25, 1972

[54] COMPOSITION COMPRISING ARYLAMINOOXAZOLINE AND ANTICHLOLIGENERIC AGENT

[72] Inventors: Rudolf Culik, 214 LaFayette St., Kennett Square, Pa. 19348; Jurg A. Schneider, 520 Rothbury Road, Wilmington, Del. 19808

[73] Assignee: E. I. du Pont de Nemours and Company, Wilmington, Del.

[22] Filed: Feb. 28, 1964

[21] Appl. No.: 348,291

[52] U.S. Cl.................424/265, 424/247, 424/251, 424/263, 424/267, 424/272, 260/307 D, 260/307 F
[51] Int. Cl........................................................A61k 27/00
[58] Field of Search............260/553, 307; 167/65; 424/247, 424/251, 263, 265, 267, 272

[56] References Cited

UNITED STATES PATENTS 2,027,031  1/1936  Engelmann.............................260/44
2,870,160  1/1959  Bloom.....................................260/307

Primary Examiner—Leland A. Sebastian
Attorney—Herbert W. Larson

EXEMPLARY CLAIM

17. A composition comprising one part by weight of an arylaminooxazoline and from about 0.5 to 30 parts by weight of a centrally acting anticholinergic agent, said arylaminooxazoline being selected from the group consisting of those of the following formulas and pharmaceutically acceptable acid addition salts thereof:

(1)

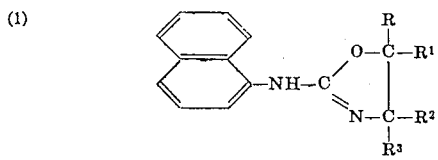

(2)

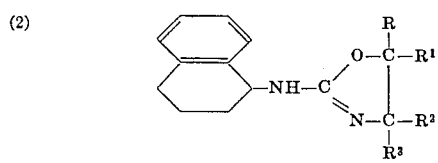

(3)

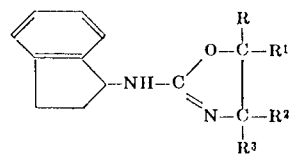

(4)

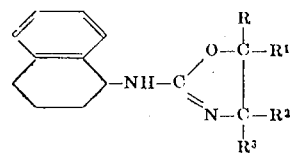

(5)

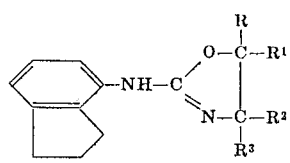

and (6)

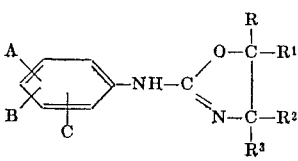

where in each of formulas (1) through (6) R, $R^1$, $R^2$ and $R^3$ are each separately selected from the group consisting of hydrogen and alkyl of 1 through 4 carbons with the total number of carbons in these four substitutents being 8; where in each of formulas (1) through (5), 1 through 3 hydrogen atoms of the moiety selected from the group consisting of naphthyl, partially reduced naphthyl and indanyl can be replaced with a member selected from the group consisting of halogen, alkyl of 1 through 4 carbons, alkoxy of 1 through 4 carbons, alkylthio of 1 through 4 carbons, trifluoromethyl and trifluoromethoxy; and where in formula (6) A is selected from the group consisting of hydrogen, alkyl of 1 through 4 carbons, alkoxy of 1 through 4 carbons and halogen; B is selected from the group consisting of alkyl of 1 through 4 carbons, alkoxy of 1 through 4 carbons and halogen; and C is selected from the group consisting of hydrogen, alkyl of 1 through 4 carbons, alkoxy of 1 through 4 carbons halogen, alkylthio of 1 through 4 carbons, alkoxyalkyl wherein the alkoxy portion has 1 through 2 carbons and the alkyl portion has 1 through 2 carbons, alkylamino of 1 through 2 carbons, dialkylamino where each alkyl group has 1 through 2 carbons, trifluoromethyl and trifluoromethoxy.

32 Claims, No Drawings

COMPOSITION COMPRISING ARYLAMINOOXAZOLINE AND ANTICHLOLIGENERIC AGENT

This invention relates to pharmaceutical compositions useful for both human and veterinary applications. More particularly, this invention relates to synergistic utilization of one or more centrally acting anticholinergic substances and one or more of a class of central nervous system depressants.

The disclosure herein should not be taken as a recommendation to use the disclosed invention in any way without full compliance with U.S. Food and Drug laws and other laws and governmental regulations which may be applicable.

According to the present invention, an amazing synergism has been noted between a centrally acting anticholinergic and compounds in a class generically identified as 2-arylamino-2-oxazolines. While the oxazolines themselves have activity, some to a remarkable extent, as regulators and in particular depressants of the central nervous system, we have now discovered that, when used with a centrally acting anticholinergic, the synergistic combination according to this invention effects a profound action, producing a striking depression of central nervous system control of skeletal muscle as well as a striking loss of response to painful stimuli. This effect resembles a deep surgical anesthesia, producing unconsciousness in the recipient in a very short time.

Centrally acting anticholinergics are a well-recognized class of pharmacologically active substances. As is well known and understood by pharmacologists, these anticholinergics can be naturally occurring or synthetic and are those substances which act to inhibit and have a highly selective blocking action on effector organs innervated by postganglionic cholinergic nerves. As is known to personS skilled in this art, anticholinergic agents containing a quaternary nitrogen moiety are of course not centrally acting.

Perhaps the best known centrally acting anticholinergics are the natural occurring alkaloids of the belladonna plants. The two most important of these alkaloids are atropine (dl-hyoscyamine) and scopolamine (l-hyoscine) and these two materials are the preferred synergists according to the present invention because of their significantly outstanding synergizing action with the 2-arylamino-2-oxazolines. Also of special importance because of outstanding activity are the centrally acting anticholinergic glycolates.

However, the use of all centrally acting anticholinergic substances is intended to be embraced within the concept of the present invention. Illustrative of such anticholinergics are the following:

Adephenine (Registered trademark), also identified as Trasentine (Registered trademark and 2-diethylaminoethyl diphenylacetate
benactyzine, also identified as beta-diethylaminoethyl benzilate
benztropine, also identified as 3-diphenylmethyoxytropane
caramiphen, also identified as 1-phenylcyclopentane-carboxylic acid, diethylaminoethyl ester
cyclopentolate, also identified a0 1-hydroxy-alpha-phenyl-cyclopentaneacetic acid, 2-dimethylamino-ethyl ester
cycrimine, also identified alpha-cyclopentyl-alpha-phenyl-1-piperidinepropanol
Ditran, also identified as N-ethyl-3-piperidyl phenyl cyclopentyl glycolate
ethopropazine, also identified as 10-(2-diethylaminopropyl) phenothiazine
oxyphencyclimine, also identified as 1-methyl-1,4,5,6-tetrahydro-2-pyrimidylmethyl alpha-cyclohexyl-alpha-phenylglycolate
piperidolate, also identified as N-ethyl-3-piperidyl diphenylacetate
systral, also identified as chlorphenoxamine and beta-dimethylaminoethyl (p-chloro-alpha-methylbenzhydryl)ether
tricyclamol, also identified as procyclidine and alpha-cyclohexyl-alpha-phenyl-1-pyrrolidine-propanol
trihexphidyl, also identified as alpha-cyclohexyl-alpha-phenyl-1-piperidinepropanol In addition to the above-mentioned anticholinergics, other illustrative materials include homotropine, atroscine, eucatropine, syntropan (amprotropine), pavatrine, banthine (methantheline), pro-banthine (propantheline), oxypenonium (antrenyl), penthienate (monodral), diphenmethanil (prantal), mepiperphenidol (darstine), dicyclomine (bentyl), aminopentamide (centrine), dibutoline and the like.

As will be readily understood, the centrally acting anticholinergics will most often be used in the form of an acid addition salt with anacid having a pharmaceutically acceptable anion. The term "pharmaceutically acceptable anion" has a definite meaning to one skilled in the art, namely, a nontoxic anion of any of the simple acids commercially used to neutralize basic medicinal agents. These acids include, for example, hydrochloric, hydrobromic, hydriodic, sulfuric, succinic, maleic, tartaric, citric, glycolic, and others. The pharmaceutical activity of the molecule is primarily but not necessarily exclusively a function of the cation.

By way of further illustration of the salts of anticholinergic agents, it can be mentioned that atropine is preferably used as the hydrobromide, hydrochloride, methylbromide, methylnitrate, salicylate, sulfate, atropine-sulfuric acid, valerate, aurichloride, platinichloride, oxalate or picrate; scopolamine as the hydrobromide, hydrochloride, aurichloride, auribromide, picrate, methylbromide, methylnitrate or aminoxide; Adephenine (Registered trademark) as the hydrochloride; benactyzine as the hydrochloride; benztropine as the methanesulfonate; caramiphen as the hydrochloride or ethanedisulfonate; cycrimine as the hydrochloride; oxyphencyclimine as the hydrochloride; systral as the hydrochloride; and trihexyphenidyl as the hydrochloride.

The second essential ingredient of the synergistic compositions of the present invention is a 2-arylamino-2-oxazoline having central nervous system depressant activity. Suitable 2-arylamino-2-oxazolines include those of the fOllowing formulas:

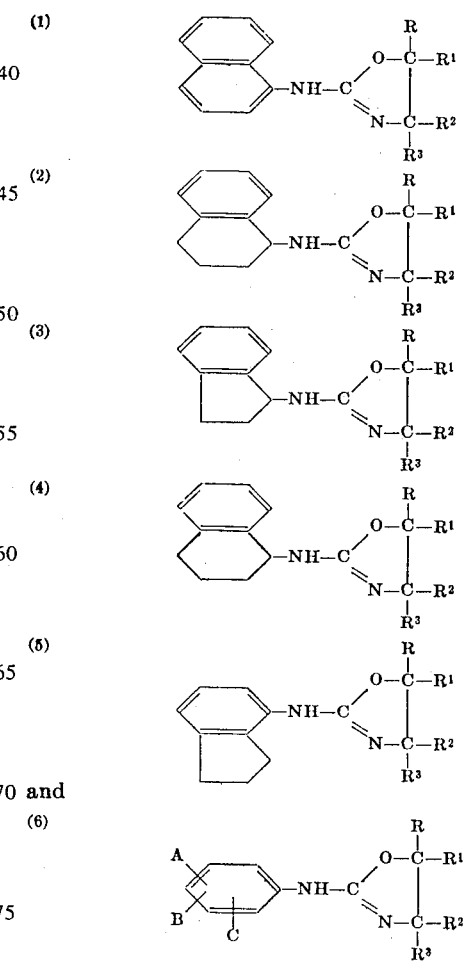

In each of the above formulas, R, R¹, R², and R³ are the same or different and can each be hydrogen or an alkyl group of one through four carbons with the total number of carbons in these four substituents being a maximum of eight. In the compounds of Formulas (1) through (5), the hydrogen atoms of the naphthyl, the partially reduced naphthyl or the indanyl groups may be replaced with substituents such as halogen, e.g., chlorine, bromine, fluorine and iodine, alkyl of one through four carbons, alkoxy of one through four carbons, alkylthio of one through four carbons, trifluoromethyl and trifluoromethoxy. Up through three such substituents can be present.

In Formula (6), A can be hydrogen, alkyl of one through four carbons, and preferably one or two carbons, alkoxy of one through four carbons, and preferably one or two carbons, or halogen including chlorine, bromine, and fluorine; B can be alkyl of one through four carbons and preferably one or two carbons, alkoxy of one through four carbons and preferably one or two carbons, or halogen including chlorine, bromine and fluorine; and C can be hydrogen, alkyl of one through four carbons and preferably one or two carbons, alkoxy of one through four carbons and preferably one or two carbons, halogen including chlorine, bromine and fluorine, alkythio of one through four and preferably one or two carbons, alkoxyalkyl wherein the alkoxy portion has one or two carbons and the alkyl portion has one or two carbons, alkylamino of one or two carbons, dialkylamino where the alkyl group can be the same or different and each has one or two carbons, trifluoromethyl or trifluoromethoxy.

Preparation

As will be noted, the compounds of Formula (1) are substituted and unsubstituted 2-(1-naphthylamino)-2-oxazolines. These compounds and a method for their preparation are described in Bloom U.S. Pat. No. 2,811,529 issued Oct. 29, 1957.

The compounds of Formula (2) are substituted and unsubstituted 2-(1,2,3,4-tetrahydro-1-naphthylamino)-2-oxazolines. A method for their preparation is described in bloom U.S. Pat. No. 2,870,159 issued Jan. 20, 1959.

The compounds of Formula (3) are substituted and unsubstituted 2-(1-indanylamino)-2-oxazolines. A method for their preparation is described in Bloom U.S. Pat. No. 2,870,161 issued Jan. 20, 1959.

The compounds of Formula (4) are substituted and unsubstituted 2-(5,6,7,8-tetrahydro-1 naphthylamino)-2-oxazolines. The compounds of formula (5) are substituted and unsubstituted 2-(5,6,7,8-tetrahydro-1-naphthylamino)-2-oxazolines. The compounds of Formula (5) are substituted and unsubstituted 2-(4-indanylamino)-2-oxazolines. These compounds of Formula (4) and (5) have remarkably superior activity as central nervous system depressants compared with the compounds of Formulas (2) and (3). The compounds of formulas (4) and (5) are claimed and their preparation described in copending U.S. patent application Ser. No. 313,756 filed Sept. 30, 1963 now U.S. Pat. No. 3,432,600, in the name of John Harvey, Jr., and assigned to the same assignee as that of the present invention.

The compounds of Formula (6) are substituted 2-anilino-2-oxazolines. They are characterized by outstanding anti-hypertensive and central nervous system depressant properties. Their pharmaceutical use is claimed and their preparation described in copending U.S. patent application Ser. No. 348,290 filed Feb. 28, 1964 now abandoned, in the name of John Harvey, Jr., and assigned to the same assignee as that of the present application. In the last-mentioned Harvey application, a preferred group of compounds having unusual effectiveness is also claimed.

Generally, the compounds of Formulas (1) through (6) are crystalline solids, they can be readily prepared by reaction of the appropriately selected arylamine and an appropriate alkyl isocyanate to form the corresponding N-aryl-N'-(beta-substituted ethyl)urea, followed by heating in a suitable solvent to close the oxazoline ring. Alternatively, the urea can be prepared by reaction between an appropriate aryl isocyanate and an appropriate alkylamine followed by ring closure.

In the foregoing procedures, the reaction between the amine and isocyanate can conveniently be carried out in a suitable inert organic solvent including both aromatic and aliphatic hydrocarbon solvents. Halogenated, oxygenated or nitrated hydrocarbon solvents are useful. Representative solvents are benzene, chloroform carbon tetrachloride, ethylene dichloride, chlorobenzene, toluene, xylene, nitrobenzene and nitrotoluene. Temperatures in the range from 0° to 110°C. are suitable.

Formation of the aryloxazoline is conveniently carried out by refluxing the urea in solution in a suitable solvent such as methanol, ethanol, propanol, butanol or preferably water, with elimination of hydrogen bromide, hydrogen chloride, hydrogen iodide, methanesulfonic acid, p-toluenesulfonic acid or the like. Since the oxazolines are basic in nature, the liberated acid adds to the oxazoline to form an acid addition salt. The free base is liberated from the salt using an alkaline reagent such as ammonium hydroxide, sodium hydroxide, sodium bicarbonate, calcium oxide or the like.

Useful synthesis techniques are described in Chem. Reviews, Vol. 44, pages 463–466 (1949).

By reference to the reaction described above, it can be seen that in the ordinary practice of the process of the invention, the oxazolines produced will be hydrobromides, hydrochlorides, hydriodides, methanesulfonic acids or p-toluenesulfonic acids. These acids can be converted to other pharmaceutically acceptable acids by procedures well known to those skilled in the art. One highly useful method comprises contacting the acid addition salt with a basic anion exchange resin, for example, a highly basic compound such as the one available from Rohm & Haas Company under the name "Amberlite IRA-400." This resin is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt of this invention, for example, the citrate, the resin is first contacted with an aqueous solution of citric acid whereupon an anion exchange takes place converting the quaternary halide to the citrate. The citrate resin is then contacted with an acid addition salt prepared as described above and a further anion exchange takes place converting the acid addition salt to the citrate and leaving the anion of the original salt on the resin. The citrate salt can be recovered from the eluate by a number of methods such as evaporation or solvent precipitation. This same procedure can be used to prepare nitrates, sulfates, acetates and other acid addition salts.

Illustrative of the compounds within the scope of Formula (1) above are the following:

2-(3,4-dichoro-1-naphthylamino)-2-oxazoline
2-(3-bromo-1-naphthylamino-2-oxazoline
2-(4-ethyl-1-naphthylamino)-4,5-dimethyl-2-oxazoline
2-(3,4,5-triiodo-1-naphthylamino)-2-oxazoline
2-(3,4-bismethylthio-1-naphthylamino)-4-butyl-2-oxazoline
2-(2,3,5-tri-sec-butoxy-1-naphthylamino)-2-oxazoline
2-(3,4-dimethoxy-1-naphthylamino)-4,5-diethyl-2-oxazoline
2-(4-tert-butylthio-1-naphthylamino)-2-oxazoline
2-(3,4-diethoxy-1-naphthylamino)-4,5-dimethyl-2-oxazoline
2-(4-isopropylthio-1-naphthylamino)-5-ethyl-2-oxazoline Illustrative of the compounds within the scope of Formula (2) above are the following:

2-(1,2,3,4-tetrahydro-3,4-dichloro-1-naphthylamino)-2-oxazoline
2(1,2,3,4-tetrahydr-3,4,5-triiodo-1-naphthylamino)-2-oxazoline
2-(1,2,3,4,-tetrahydro-3,4,5-trimethyl-1-naphthylamino)-2-oxazoline
2-(1,2,3,4-tetrahydro-3,4-dimethoxy-1-naphthylamino)-4,5-diethyl-2-oxazoline
2-(1,2,3,4-tetrahydro-4-tetrahydroisopropyl-1-naphthylamino)-5-ethyl-2-oxazoline Illustrative of the compounds within the scope of Formula (3) above are the following:

2-(2,3-dichloro-1-indanylamino)-2-oxazoline
2-(2-bromo-1-indanylamino)-4-methyl-2-oxazoline
2-(4-ethyl-1-indanylamino)-1,5-dimethyl-2-oxazoline
2-(2,3,5-triiodo-1-indanylamino)-2-oxazoline
2-(3,4-bismethylthio-1-indanylamino)-4-butyl-2-oxazoline
2-(2,3,5-tri-sec-butoxy-1-indanylamino)-4,5-diethyl-2-oxazoline
2-(4-tert-butylthio-1-indanylamino)-2-oxazoline
2-(2,3,5-trimethyl-1-indanylamino)-2-oxazoline
2-(2,3,5-trimethylthio-1-indanylamino)-2-oxazoline
2-(2,7-diethoxy-1-indanylamino)-4,5-dimethyl-2-oxazoline
2-(4-isopropylthio-1-indanylamino)-5-ethyl-2-oxazoline Illustrative of the compounds within the scope of Formula (4) above are the following:

2-(5,6,7,8-tetrahydro-1-naphthylamino)-2-oxazoline
2-(5,6,7,8-tetrahydro-2-chloro-1-naphthylamino)-2-oxazoline
2-(5,6,7,8-tetrahydro-3,4-dimethyl-1-naphthylamino)-2-oxazoline
2-(5,6,7,8-tetrahydro-1-naphthylamino)-4-butyl-2-oxazoline
2-(5,6,7,8-tetrahydro-2-methyl-1-naphthylamino)-2-oxazoline
2-(5,6,7,8-tetrahydro-4-chloro-1-naphthylamino)-2-oxazoline
2-(5,6,7,8-tetrahydro-2,4-diiodo-1-naphthylamino)-2-oxazoline
2-(5,6,7,8-tetrahydro-2,5-dibromo-1-naphthylamino)-4-butyl-2-oxazoline
2-(5,6,7,8-tetrahydro-2,3,4-trimethylthio-1-naphthylamino)-2-oxazoline
2-(5,6,7,8-tetrahydro-4-fluoro-1-naphthylamino)-4,5-dimethyl-2-oxazoline
2-(5,6,7,8-tetrahydro-2,4-diethyl-1-naphthylamino)-2-oxazoline
2-(5,6,7,8-tetrahydro-2,3-dimethoxy-1-naphthylamino)-4-methyl-2-oxazoline
2-(5,6,7,8-tetrahydro-2,3,5-tri-sec-butoxy-1-naphthylamino)-2-oxazoline
2-(5,6,7,8-tetrahydro-2,5-dimethylthio-1-naphthylamino)-4-methyl-5-sec-butyl-2-oxazoline
2-(5,6,7,8-tetrahydro-2,5-bisethylthio-1-naphthyl-amino)-4,5-dimethyl-2-oxazoline
2-(5,6,7,8-tetrahydro-2,3-diethoxy-1-naphthylamino)-2-oxazoline
2-(5,6,7,8-tetrahydro-3,4-dichloro-1-naphthylamino)-2-oxazoline
2-(5,6,7,8-tetrahydro-3-bromo-1-naphthylamino)-4-methyl-2-oxazoline
2-(5,6,7,8-tetrahydro-3,4,5-triiodo-1-naphthylamino)-4,5-dimethyl-2-oxazoline
2-(5,6,7,8-tetrahydro-4-isopropyl-1-naphthylamino)-2-oxazoline
2-(5,6,7,8-tetrahydro-4-trifluoromethyl-1-naphthylamino)-2-oxazoline
2-(5,6,7,8-tetrahydro-4-trifluoromethoxy-1-naphthylamino)-2oxazoline Illustrative of the compounds within the scope of Formula (5) above are the following:

2-(4-indanylamino)-2-oxazOline
2-(2-chloro-4-indanylamino)-2-oxazoline
2-(2,5-diiodo-4-indanylamino)-2-oxazoline
2-(3,5-bis-propylthio-4-indanylamino)-2-oxazoline
2-(2-methyl-4-indanylamino)-2-oxazoline Illustrative of the compounds within the scope of Formula (6) are the following:

2-(2-toluidino)-2-oxazoline
2-(2,3-dimethylanilino)-2-oxazoline
2-(3-chloro-2-methylanilino)-2-oxazoline
2-(2-ethylanilino)-2-oxazoline
2-(3,4-dimethylanilino)-2-oxazoline
2-(3-isopropylanilino)-2-oxazoline
2-(2,3,4-trichloroanilino)-2-oxazoline
2-(4-methoxy-2-methylanilino)-2-oxazoline
5-methyl-2-(2,3-dimethylanilino)-2-oxazoline
4-ethyl-2-(2,3-dimethylanilino)-2-oxazoline
4,4-dimethyl-2-(2-methyl-3-chloroanilino)-2-oxazoline
5-butyl-2-(2-methylanilino)-2-oxazoline
2-(2-dimethylaminoanilino)-2-oxazoline
2-(3-methylthioanilino)-2-oxazoline
2-(2-trifluoromethylanilino)-2-oxazoline
2-(2-trifluoromethoxy-3-methylanilino)-2-oxazoline
2-(2,4,5-trimethylanilino)-2-oxazoline
4-methyl-2-(2-methyl-5-isopropylanilino)-2-oxazoline
2-(2,5-dimethoxyanilino)-2-oxazoline
5-methyl-2-(2,4-dimethoxy-5-chloroanilino)-2-oxazoline
2-(2-fluoroanilino)-2-oxazoline
2-(2-bromo-4-methylanilino)-2-oxazoline
2-(2,5-diethoxyanilino)-2-oxazoline
2-(3-chloro-4-methylanilino)-2-oxazoline
2-(2,6-diethylanilino)-2-oxazoline
2-(4-chloro-2-trifluoromethylanilino)-2-oxazoline
2-(3-chloro-4-fluoroanilino)-2-oxazoline
2-(4-fluoro-2-methylanilino)-2-oxazoline In the practice of the present invention it should be fully appreciated that administration of the anticholinergic and the arylaminooxazoline for the intended profound depressant effect will be more or less concurrent, i.e., united in action, and not necessarily simultaneously, i.e., in the same pharmaceutical formulation or dosage unit. Thus, it will be understood that the synergistic benefits of the present invention will be readily obtainable even though either one or the other of the two essential materials may be administered somewhat prior to or subsequent to the administration of the other. For example, for gradual inducement of profound central nervous system depression with apparent unconsciousness in a patient, it may under some circumstances be desirable to administer first the arylaminooxazoline, perhaps orally, followed within say 30 minutes or an hour by administration, perhaps by injection, of the synergistic amount of the anticholinergic agent.

Of course the precise length of time which can elapse between administration of the anticholinergic and the arylaminooxazoline, or vice versa, to still obtain the synergistic co-action of the compounds has not been determined for each combination of the two different materials possible according to this invention. The precise time lapse will depend on the amount of each administered, the condition of the recipient, the absorption characteristics of each material, the dosage form or method, the nature of the effect desired, etc., as will be determined by the attendant physician or veterinarian. Generally speaking, it is believed that provided the dosages of each are sufficient, the synergistic action is obtainable if the two components are administered within, say, 2 or 3 hours of each other.

The amount of each of the two essential materials to be administered will of course also depend upon the variables just mentioned but, in general, the arylamino-oxazoline will be administered in the range of about 0.1 to 500 milligrams per day. For the synergistic effect, for each part by weight of arylaminooxazoline used, there will usually be used from about 0.5 to about 30 parts by weight of anticholinergic agent, and preferably about 0.5 to about 5 parts by weight of the latter. The absolute potency of each of the ingredients will of course be the prime determining factors.

As mentioned above, in general, the physician or veterinarian will, of course, determine the dosage of each and the total dosage which will be most suitable for a particular application, and as might be expected, it will vary with the age, weight and general health of the patient under treatment and with various other factors which will be determined by the physician or veterinarian in attendance. When they are administered orally a larger quantity will be required to produce the same effect as a smaller quantity given parenterally. Parenteral administration of from 0.1 mg. to 250 mg. of each active agent should be suitable to obtain some effect. Administration can also be by vapor or spray through the mouth or nasal passages.

In animal tests to date no synergism of cardiovascular actions has thus far been noted. Furthermore, based on tests to date, it is believed that the surprising synergism in inducement of profound central nervous system depression obtained according to the present invention is achieved without at the same time substantially altering the normally expected effect of centrally acting anticholinergic agents on the heart rate.

In the practice of this invention, the active pharmaceutical agents may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

Compositions useful in the practice of the present invention may take a variety of forms. Various diluents may be employed and the percentage of active ingredients may be varied. It is necessary that the active ingredient or ingredients form a proportion of the composition such that a suitable dosage form will be obtained. Obviously several dosage unit forms can be administered at about the same time. Although compositions with less than 0.005 percent by weight of either active ingredient are Suitable, it is preferred to use compositions containing not less than 0.005 percent of either active agent because otherwise the amount of carrier becomes excessively large. Activity normally increases with the concentration of the active agent. The percentage by weight of single or combined active agents can be 10, 50, 75, 95 percent or even higher. Dosage unit forms may be prepared with a minor proportion of a carrier and a major proportion of active materials and vice versa.

The following examples are given solely for the purpose of illustration and are not to be construed as limitations of this invention, many variations of which are possible without departing from the spirit or scope thereof.

EXAMPLE 1

A large number of unit capsules are prepared for oral administration by mixing the following ingredients:

| | Parts by Weight |
|---|---|
| 2-(5,6,7,8-tetrahydro-1-naphthyl-amino)-2-oxazoline | 650 |
| scopolamine hydrobromide | 1,300 |
| lactose U.S.P. | 8,000 |
| Dry pyrogenic silica $SiO_2$ with particle size of 0.015 microns, surface area of 200 $m^2$/gm, and bulk density of 2.2 lbs/cu.ft. ("Cabosil," Cabot Corp.) | 50 |

After mixing, the mixture is screed through a 40 mesh screen and encapsulated in No. 3 two-piece hard gelatin capsules.

EXAMPLE 2

The active ingredients of Example 1 (20 parts by weight) is dispersed in 100 parts by volume of corn oil and encapsulated in standard soft gelatin capsules.

EXAMPLE 3

Tablets for oral administration are prepared by mixing 50 milligrams of the active ingredients of Example 1, 2.5 milligrams of gelatin, 2.5 milligrams of magnesium stearate and 100 milligrams of starch, and forming the mixture into tablets by a conventional tableting machine. Slow release pills and tablets can also be used.

EXAMPLE 4

A parenteral composition suitable for administration by injection is prepared by dissolving 5 percent by weight of the active ingredients of Example 1 in 95 percent by volume of physiological saline and sterilizing the resultant solution by filtration. A buffer can be used if desired.

EXAMPLE 5

2-(5,6,7,8-tetrahydro-1-naphthylamino)-2-oxazoline (0.2 parts by weight) is dissolved at a concentration of 2 milligrams per milliliter in a mixture of 25 parts by weight of polyethylene glycol ("Carbowax" 400) and 75 parts by weight of physiological saline. The resulting solution is then combined with an equal volume of a solution of 4 milligrams of atropine sulfate dissolved in 1 milliliter of physiological saline. The combined solution is injected into the cephalic vein of a 2-year old beagle dog so that a total of 0.1 milligram of the oxazoline and 0.2 milligram of the atropine sulfate, per kilogram of body weight of the dog, is administered. In about 15 minutes the animal becomes depressed and passes into a state of deep central nervous system depression in which the animal does not respond to painful stimuli. This state lasts for about 1 to 2 hours following which the animal recovers normal functions with no deleterious after-effects.

EXAMPLE 6

A 1-year old female dog is given an intravenous injection of atropine sulfate dissolved in 0.4 percent by weight concentration in physiological saline. The injection is sufficient to introduce 0.2 milligram of the atropine sulfate per kilogram of body weight of the dog. The injection of atropine sulfate is followed 10 minutes later by intravenous injection of 2-(5,6,7,8-tetrahydro-1-naphthylamino)-2-oxazoline, dissolved in 0.2 percent by weight concentration in polyethylene glycol (25 parts) and physiological saline (75 parts), in amount sufficient to introduce 0.1 milligram of the oxazoline per kilogram of body weight. In about 15 minutes the animal becomes depressed and passes into a state of deep central nervous system depression in which the animal does not respond to painful stimuli. This state lasts for about 1 to 2 hours following which the animal recovers normal functions with no deleterious after-effects.

EXAMPLE 7

2-(2,3-dimethylanilino)-2-oxazoline (3 parts by weight) is dissolved in 1,000 parts by weight of a mixture of 25 parts by weight of polyethylene glycol ("Carbowax" 400) and 75 parts by weight of physiological saline. The resulting solution is injected intravenously into a 2-year old male dog in an amount to introduce 0.132 milligram of oxazoline per kilogram of body weight of the dog. This injection is followed in 10 minutes by intravenous administration of a normal saline solution of atropine sulfate, sufficient to introduce 0.5 milligram of atropine sulfate per kilogram of body weight of the dog. In about 15 minutes the animal becomes depressed and passes into a state of deep central nervous system depression in which the animal does not respond to painful stimuli. This state lasts for about 1 to 2 hours following which the animal recovers normal functions with no deleterious after-effects.

EXAMPLE 8

Example 7 is repeated, except that scopolamine hydrobromide is used in place of the atropine sulfate, with similar results.

EXAMPLE 9

Example 6 is repeated, except that in place of the atropine sulfate there is used an amount of phenyl cyclopentylglycolic acid, N-ethylpiperidinol ester, sufficient to introduce 0.2 milligram of the ester per kilogram of body weight of the dog, with similar results.

EXAMPLE 10

Example 5 is repeated, except that in place of the atropine there is used an amount of benzilic acid, beta-diethylaminoethyl ester, sufficient to introduce 0.1 milligram of the ester per kilogram of body weight of the dog, with similar results.

EXAMPLE 11

Rhesus monkeys are exposed for 5 minutes in a dynamic chamber to an atmosphere containing 400 micrograms per liter of 2-(5,6,7,8-tetrahydro-1-naphthylamino)-2-oxazoline and 800 micrograms per liter of scopolamine aspirated into the chamber in the form of an aerosol. Within 3 to 5 minutes the animals become prostrate, severely depressed and apparently unconscious for a period of about 1 hour.

EXAMPLES 12 - 26

The procedures of Examples 5 and 6 are repeated except that the following listed anticholinergic agents and arylaminooxazolines are substituted in like amount by weight for those of Examples 5 and 6 respectively. They are administered in like manner and provide like results.

| Example | Amount (mg./kg.) | 2-oxazoline | Amount (mg./kg.) | Anticholinergic |
|---|---|---|---|---|
| 12 | 0.25 | 2-(1-naphthylamino)- | 0.500 | Atropine sulfate. |
| 13 | 0.2 | 2-(4-methoxy-1-naphthylamino)- | 0.400 | Scopolamine hydrobromide. |
| 14 | 0.2 | ....do.... | 5.00 | Benzetyzine. |
| 15 | 0.2 | 2-(2-methyl-1-naphthylamino)- | 0.400 | Scopolamine hydrobromide. |
| 16 | 1.0 | 2-(4-methyl-1-naphthylamino)- | 1.00 | Atropine sulfate. |
| 17 | 0.1 | 2-(5,6,7,8-tetrahydro-1-naphthylamino)- | 10.00 | Trasentine. |
| 18 | 0.1 | 2-(4-methyl-5,6,7,8-tetrahydro-1-naphthylamino)- | 0.500 | Benztropine. |
| 19 | 0.5 | 2-(4-methoxy-5,6,7,8-tetrahydro-1-naphthylamino)- | 1.00 | Ditran. |
| 20 | 0.1 | 2-(1,2,3,4-tetrahydro-1-naphthylamino)- | 25.00 | Caramiphen. |
| 21 | 0.25 | 2-(2-methylanilino)- | 0.500 | Cyclopentolate. |
| 22 | 0.5 | 2-(2-ethylanilino)- | 5.00 | Cycrimine hydrochloride. |
| 23 | 0.1 | 2-(2,3-dimethylanilino)- | 50.0 | Ethopropazine. |
| 24 | 0.25 | 2-(2-chloro-2-methylanilino)- | 50.0 | Piparidolate. |
| 25 | 0.1 | 2-(2,6-dimethylanilino)- | 20.0 | Oxyphencyclimine. |
| 26 | 0.75 | 2-(4-methoxy-2-methylanilino)- | 5.00 | Tricyclamol. |

The invention claimed is:

1. The method comprising administering to a warm-blooded animal two essential substances within 3 hours of each other, the first essential substance being a centrally acting anticholinergic agent and the second essential substance being selected from the group consisting of a 2-arylamino-2-oxazoline and pharmaceutically acceptable acid addition salts thereof, there being used from about 0.5 to 30 parts by weight of said anticholinergic agent for each part by weight of said second essential substance, and said 2-arylamino-2-oxazoline being a compound selected from the group consisting of (1) 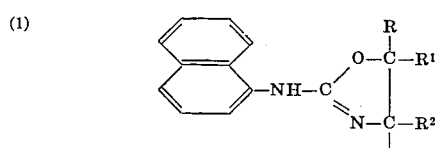

(2) 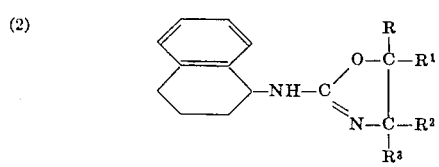

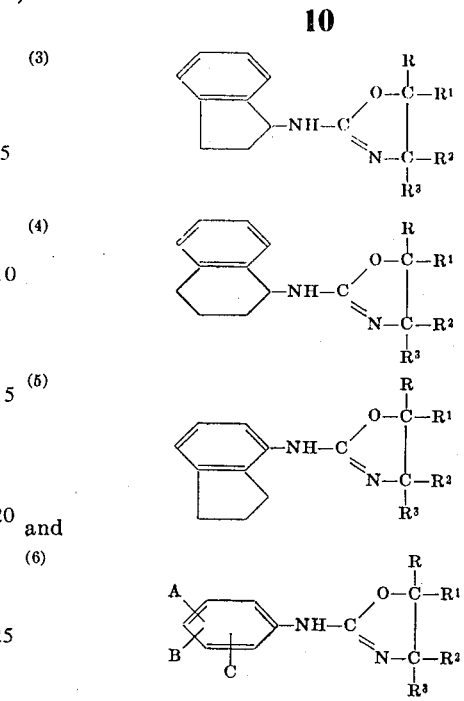

where in each of Formulas (1) through (6) R, R$^1$, R$^2$, and R$^3$ are each separately selected from the group consisting of hydrogen and alkyl of one through four carbons with the total number of carbons in these four substituents being 8; where in each of Formulas (1) through (5), one through three hydrogen atoms of the moiety selected from the group consisting of naphthyl, partially reduced naphthyl and indanyl can be replaced with a member selected from the group consisting of halogen, alkyl of one through four carbons, alkoxy of one through four carbons, alkylthio of one through four carbons, trifluoromethyl and trifluoromethoxy; and where in Formula (6) A is selected from the group consisting of hydrogen, alkyl of one through four carbons, alkoxy of one through four carbons and halogen;

B is selected from the group consisting of alkyl of one through four carbons, alkoxy of one through four carbons and halogen; and C is selected from the group consisting of hydrogen, alkyl of one through four carbons, alkoxy of one through four carbons, halogen, alkylthio of one through four carbons, alkoxyalkyl wherein the alkoxy portion has one through two carbons and the alkyl portion has one through two carbons, alkylamino of one through two carbons, dialkylamino where each alkyl group has one through two carbons, trifluoromethyl and trifluoromethoxy.

2. The method according to claim 1 where said centrally acting anticholinergic is a glycolate.

3. The method comprising administering to a warm-blooded animal, within an hour of each other, a compound selected from the group consisting of 2-(1-naphthylamino)-2-oxazoline and pharmaceutically acceptable acid addition salts of said oxazoline and, for each one part by weight of said compound, from about 0.5 to 30 parts by weight of a centrally acting anticholinergic agent, said oxazoline having the formula

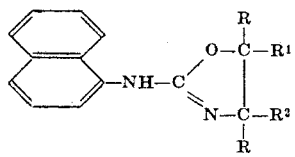

where R, R¹, R², and R³ are each selected from the group consisting of hydrogen and alkyl of one through four carbons with the total number of carbons in each of these four substituents being eight; and where one through three of the hydrogen atoms in the naphthyl group can be replaced with a member selected from the group consisting of halogen, alkyl of one through four carbons, alkoxy of one through four carbons, alkylthio of one through four carbons, trifluoromethyl and trifluoromethoxy.

4. The method comprising administering to a warm-blooded animal, within a hour of each other, a compound selected from the group consisting of a 2-(1,2,3,4-tetrahydro-1-naphthylamino)-2-oxazoline and pharmaceutically acceptable acid addition salts of said oxazoline and, for each one part by weight of said compound, from about 0.5 to 30 parts by weight of a centrally acting anticholinergic agent, said oxazoline having the formula

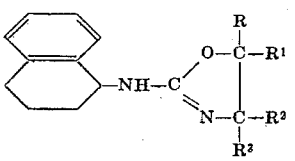

where R, R¹, R² and R³ are each selected from the group consisting of hydrogen and alkyl of one through four carbons with the total number of carbons in each of these four substituents being eight; and where one through three of the hydrogen atoms in the partially reduced naphthyl group can be replaced with a member selected from the group consisting of halogen, alkyl of one through four carbons, alkoxy of one through four carbons, alkylthio of one through four carbons, trifluoromethyl and trifluoromethoxy.

5. The method comprising administering to a warm-blooded animal, within an hour of each other, a compound selected from the group consisting of a 2-(1-indanyl)-2-oxazoline and pharmaceutically acceptable acid addition salts of said oxazoline and, for each one part by weight of said compound, from about 0.5 to 30 parts by weight of a centrally acting anticholinergic agent, said oxazoline having the formula

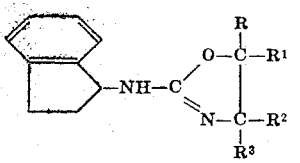

where R, R¹, R², and R³ are each selected from the group consisting of hydrogen and alkyl of one through four carbons with the total number of carbons in each of these four substituents being eight; and where one through three of the hydrogen atoms in the indanyl group can be replaced with a member selected from the group consisting of halogen, alkyl of one through four carbons, alkoxy of one through four carbons, alkylthio of one through four carbons, trifluoromethyl and trifluoromethoxy.

6. The method comprising administering to a warm-blooded animal, within an hour of each other, a compound selected from the group consisting of a 2-(5,6,7,8-tetrahydro-1-naphthylamino)-2-oxazoline and pharmaceutically acceptable acid addition salts of said oxazoline and, for each one part by weight of said compound, from about 0.5 to 30 parts by weight of a centrally acting anticholinergic agent, said oxazoline having the formula:

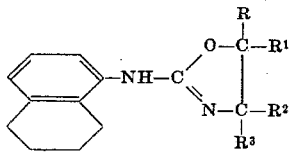

where R, R¹, R², and R³ are each selected from the group consisting of hydrogen and alkyl of one through four carbons with the total number of carbons in each of these four substituents being eight; and where one through three of the hydrogen atoms in the partially reduced naphthyl group can be replaced consisting of halogen, alkyl of one through four carbons, alkoxy of one through four carbons, alkylthio of one through four carbons, trifluoromethyl and trifluoromethoxy.

7. The method comprising administering to a warm-blooded animal, within an hour of each other, a compound selected from the group consisting of a 2-(4-indanylamino)-2-oxazoline and pharmaceutically acceptable acid addition salts of said oxazoline and, for each one part by weight of said compound, from about 0.5 to 30 parts by weight of a centrally acting anticholinergic agent, said oxazoline having the formula

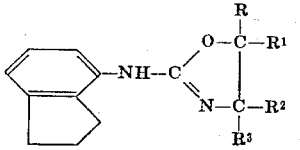

where R, R¹, R², and R³ are each selected from the group consisting of hydrogen and alkyl of one through four carbons with the total number of carbons in each of these four substituents being eight; and where one through three of the hydrogen atoms in the indanyl group can be replaced with a member selected from the group consisting of halogen, alkyl of one through four carbons, alkoxy of one through four carbons, alkylthio of one through four carbons, trifluoromethyl and trifluoromethoxy.

8. The method comprising administering to a warm-blooded animal, within an hour of each other, a compound selected from the group consisting of a 2-anilino-2-oxazoline and pharmaceutically acceptable acid addition salts of said oxazoline and, for each one part by weight of said compound, from about 0.5 to 30 parts by weight of a centrally acting anticholinergic agent, said oxazoline having the formula

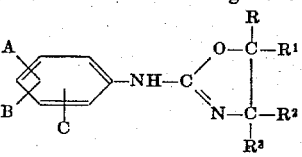

where R, R¹, R², and R³ are each selected from the group consisting of hydrogen and alkyl of one through four carbons with the total number of carbons in each of these four substituents being eight; A is selected from the group consisting of hydrogen, alkyl of one through four carbons, alkoxy of one through four carbons and halogen; B is selected from the group consisting of alkyl of one through four carbons, alkoxy of one through four carbons and halogen; and C is selected from the group consisting of hydrogen, alkyl of one through four carbons, alkoxy of one through four carbons, halogen, alkyl-thio of one through four carbons, alkoxyalkyl wherein the alkoxy portion has one through two carbons and the alkyl portion has one through two carbons, alkylamino of one through two carbons, dialkylamino where each alkyl group has one through two carbons, trifluoromethyl and trifluoromethoxy.

9. The method according to claim 1 wherein said anticholinergic agent is atropine sulfate and said oxazoline is 2-(5,6,7,8-tetrahydro-1-naphthylamino)-2-oxazoline.

10. The method according to claim 1 wherein said anticholinergic agent is atropine sulfate and said oxazoline is 2-(2,3-dimethylanilino)-2-oxazoline.

11. The method according to claim 1 wherein said anticholinergic agent is scopolamine hydrobromide and said oxazoline is 2-(5,6,7,8-tetrahydro-1-naphthylamino)-2-oxazoline.

12. The method according to claim 1 wherein said anticholinergic agent is scopolamine hydrobromide and said oxazoline is 2-(2,3-dimethylanilino)-2-oxazoline.

13. The method according to claim 1 wherein said anticholinergic agent is benzilic acid, phenyl cyclopentylglycolic acid, N-ethylpiperidinol ester, and said oxazoline is 2-(5,6,7,8-tetrahydro-1-naphthylamino)-2-oxazoline.

14. The method according to claim 1 wherein said anticholinergic agent is benzilic acid, phenyl cyclopentylglycolic acid, N-ethylpiperidinol ester, and said oxazoline is 2-(2,3-dimethylanilino)-2-oxazoline.

15. The method according to claim 1 wherein said anticholinergic agent is benzilic acid, beta-diethylaminoethyl ester, and said oxazoline is 2-(5,6,7,8-tetrahydro-1-naphthylamino)-2-oxazoline.

16. The method according to claim 1 wherein said anticholinergic agent is benzilic acid, beta-diethylaminoethyl ester, and said oxazoline is 2-(2,3-dimethyl-anilino)-2-oxazoline.

17. A composition comprising one part by weight of an arylaminooxazoline and from about 0.5 to 30 parts by weight of a centrally acting anticholinergic agent, said arylaminooxazoline being selected from the group consisting of those of the following formulas and pharmaceutically acceptable acid addition salts thereof:

(1) 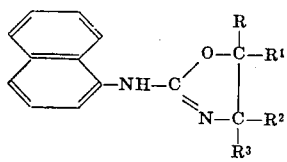

(2) 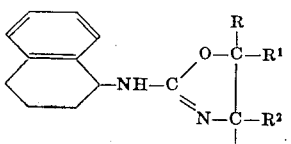

(3) 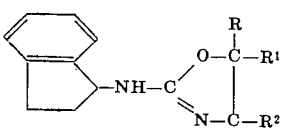

(4) 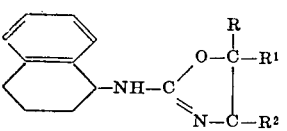

(5) 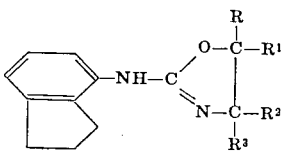

and (6) 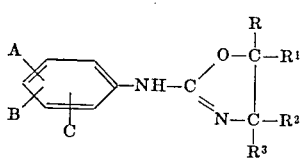

where in each of Formulas (1) through (6) R, R¹, R², and R³ are each separately selected from the group consisting of hydrogen and alkyl of one through four carbons with the total number of carbons in these four substituents being eight; where in each of Formulas (1) through (5), 1 through 3 hydrogen atoms of the moiety selected from the group consisting of naphthyl, partially reduced naphthyl and indanyl can be replaced with a member selected from the group consisting of halogen, alkyl of one through four carbons, alkoxy of one through four carbons, alkylthio of one through four carbons, trifluoromethyl and trifluoromethoxy; and where in Formula (6) A is selected from the group consisting of hydrogen, alkyl of one through four carbons, alkoxy of one through four carbons and halogen;

B is selected from the group consisting of alkyl of one through four carbons, alkoxy of one through four carbons and halogen; and C is selected from the group consisting of hydrogen, alkyl of one through four carbons, alkoxy of one through four carbons halogen, alkylthio of one through four carbons, alkoxyalkyl wherein the alkoxy portion has one through two carbons and the alkyl portion has one through two carbons, alkylamino of one through two carbons, dialkylamino where each alkyl group has one through two carbons, trifluoromethyl and trifluoromethoxy.

18. A composition according to claim 17 wherein said centrally acting anticholinergic is a glycolate.

19. A composition comprising one part by weight of an arylaminooxazoline and from about 0.5 to 30 parts by weight of a centrally acting anticholinergic agent, said arylaminooxazoline being selected from the group consisting of those of the following formula and pharmaceutically acceptable acid addition salts thereof:

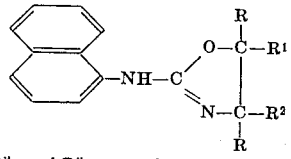

where R, R¹, R², and R³ are each selected from the group consisting of hydrogen and alkyl of one through four carbons with the total number of carbons in each of these four substituents being eight; and where one through three of the hydrogen atoms in the naphthyl group can be replaced with a member selected from the group consisting of halogen, alkyl of one through four carbons, alkoxy of one through four carbons, alkylthio of one through four carbons, trifluoromethyl and trifluoromethoxy.

20. A composition comprising one part by weight of an arylaminooxazoline and from about 0.5 to 30 parts by weight of a centrally acting anticholinergic agent, said arylaminooxazoline being selected from the group consisting of those of the following formula and pharmaceutically acceptable acid addition salts thereof:

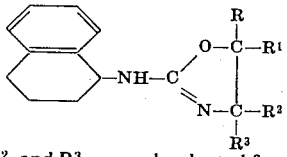

where R, R¹, R², and R³ are each selected from the group consisting of hydrogen and alkyl of one through four carbons with the total number of carbons in each of these four substituents being eight; and where one through three of the hydrogen atoms in the partially reduced naphthyl group can be replaced with a member selected from the group consisting of halogen, alkyl of one through four carbons, alkoxy of one through four carbons, alkylthio of one through four carbons, trifluoromethyl and trifluoromethoxy.

21. A composition comprisinG one part by weight of an arylaminooxazoline and from about 0.5 to 30 parts by weight of a centrally acting anticholinergic agent, said arylaminooxazoline being selected from the group consisting of those the following formula and pharmaceutically acceptable acid addition salts thereof:

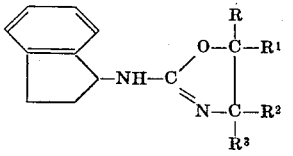

where R, R¹, R², and R³ are each selected from the group consisting of hydrogen and alkyl of one through four carbons with the total number of carbons in each of these four substituents being eight; and where one through three of the hydrogen atoms in the indanyl group can be replaced with a member selected from the group consisting of halogen, alkyl of one through four carbons, alkoxy of one through four carbons, alkylthio of one through four carbons, trifluoromethyl and trifluoromethoxy.

22. A composition comprising one part by weight of an arylaminooxazoline and from about 0.5 to 30 parts by weight of a centrally acting anticholinergic agent, said arylaminooxazoline being selected from the group consisting of those of the following formula and pharmaceutically acceptable acid addition salts thereof:

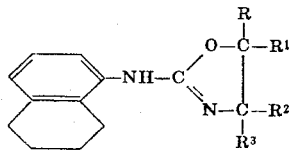

where R, R¹, R², and R³ are each selected from the group consisting of hydrogen and alkyl of one through four carbons with the total number of carbons in each of these four substituents being eight; and where one through three of the hydrogen atoms in the partially reduced naphthyl group can be replaced consisting of halogen, alkyl of one through four carbons, alkoxy of one through four carbons, alkylthio of one through four carbons, trifluoromethyl and trifluoromethoxy.

23. A composition comprising one part by weight of an arylaminooxazoline and from about 0.5 to 30 parts by weight of a centrally acting anticholinergic agent, said arylaminooxazoline being selected from the group consisting of those of the following formula and pharmaceutically acceptable acid addition salts thereof:

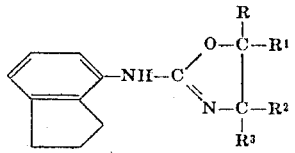

where R, R¹, R², and R³ are each selected from the group consisting of hydrogen and alkyl of one through four carbons with the total number of carbons in each of these four substituents being eight; and where one through three of the hydrogen atoms in the indanyl group can be replaced with a member selected from the group consisting of halogen, alkyl of one through four carbons, alkoxy of one through four carbons, alkylthio of one through four carbons, trifluoromethyl and trifluoromethoxy.

24. A composition comprising one part by weight of an arylaminooxazoline and from about 0.5 to 30 parts by weight of a centrally acting anticholinergic agent, said arylaminooxazoline being selected from the group consisting of those of the following formula and pharmaceutically acceptable acid addition salts thereof:

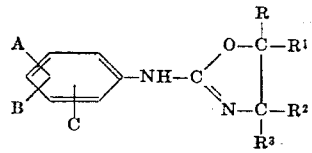

where R, R¹, R², and R³ are each selected from the group consisting of hydrogen and alkyl of one through four carbons with the total number of carbons in each of these four substituents being eight; A is selected from the group consisting of hydrogen, alkyl of one through four carbons, alkoxy of one through four carbons and halogen; B is selected from the group consisting of alkyl of one through four carbons, alkoxy of one through four carbons and halogen; and C is selected from the group consisting of hydrogen, alkyl of one through four carbons, alkoxy of one through four carbons, halogen, alkylthio of one through four carbons, alkoxyalkyl wherein the alkoxy portion has one through two carbons and the alkyl portion has one through two carbons, alkylamino of one through two carbons, dialkylamino where each alkyl group has one through two carbons, trifluoromethyl and trifluoromethoxy.

25. A composition comprising by weight 1 part of 2-(5,6,7,8-tetrahydro-1-naphthylamino)-2-oxazoline and 0.5-30 parts of atropine sulfate.

26. A composition comprising by weight 1 part of 2-(2,3-dimethylanilino)-2-oxazoline and 0.5-30 parts of atropine sulfate.

27. A composition comprising by weight 1 part of 2-(5,6,7,8-tetrahydro-1-naphthylamino)-2-oxazoline and 0.5 to 30 parts of scopolamine hydrobromide.

28. A composition comprising by weight 1 part of 2-(2,3-dimethylanilino)-2-oxazoline and 0.5-30 parts of scopolamine hydrobromide.

29. A composition comprising by weight 1 part of 2-(5,6,7,8-tetrahydro-1-naphthylamino)-2-oxazoline and 0.5 to 30 parts of benzilic acid, phenyl cyclopentylglycolic acid, N-ethylpiperidinol ester.

30. A composition comprising by weight 1 part of 2-(2,3-dimethylanilino)-2-oxazoline and 0.5 to 30 parts of benzilic acid, phenyl cyclopentylglycolic acid, N-ethylpiperidinol ester.

31. A composition comprising by weight 1 part of 2-(2,3-dimethylanilino)-2-oxazoline 0.5 to 30 parts of benzilic acid, phenyl cyclopentylglycolic acid, N-ethylpiperidinol ester.

31. A composition comprising by weight 1 part of 2-(5,6,7,8-tetrahydro-1-naphthylamino)-2-oxazoline and 0.5 to 30 parts of benzilic acid, beta-diethylaminoethyl ester.

32. A composition comprising by weight 1 part of 2-(2,3-dimethylanilino)-2-oxazoline and 0.5-30 parts of benzilic acid, beta-diethylaminoethyl ester.

* * * * *